United States Patent [19]
Culpepper, Jr.

[11] 3,946,650
[45] Mar. 30, 1976

[54] VENTILATION APPARATUS AND METHOD
[75] Inventor: Clifford Culpepper, Jr., Charlotte, N.C.
[73] Assignee: Aero-Dyne Manufacturing, Inc., Charlotte, N.C.
[22] Filed: July 1, 1974
[21] Appl. No.: 484,810

Related U.S. Application Data
[63] Continuation-in-part of Ser. No. 41,995, June 1, 1970, abandoned, and a continuation-in-part of Ser. No. 820,377, April 30, 1969, Pat. No. 3,585,919.

[52] U.S. Cl. ..................... 98/115 K; 55/1; 55/345; 55/459 R; 55/DIG. 36; 55/473
[51] Int. Cl.² ........................................ B01D 45/12
[58] Field of Search .......... 55/DIG. 36, 1, 459, 124, 55/345, 473; 98/115 K

[56] References Cited
UNITED STATES PATENTS

| | | | |
|---|---|---|---|
| 730,782 | 6/1903 | Morrison | 55/459 |
| 2,554,694 | 5/1951 | Belt | 55/DIG. 36 |
| 2,593,251 | 4/1952 | Bonacci et al. | 55/124 |
| 3,585,919 | 6/1971 | Culpepper | 55/DIG. 36 |
| 3,618,659 | 11/1971 | Rawal | 55/DIG. 36 |

Primary Examiner—Bernard Nozick
Attorney, Agent, or Firm—Bell, Seltzer, Park & Gibson

[57] ABSTRACT

A workspace, within a building where a process is practiced by which airborne liquid particulate grease is generated, is ventilated by an apparatus and in accordance with a method by which air is induced to flow at conveying velocity from the workspace into an unrestricted hood and through an unrestricted duct to a location remote from the workspace, entraining airborne liquid particulate grease with the air and thereby unrestrictedly conveying entrained grease from the workspace to the remote location. At the remote location, the flowing air and conveyed grease is directed into a collection chamber and there guided along an at least partially circular, sharply turning flow path while first accelerating and then decelerating the velocity of flow thereby separating the conveyed grease from the flowing air. The separated grease is retained in the collection chamber while the flowing air which conveyed the grease to the chamber is passed to the ambient atmosphere.

3 Claims, 5 Drawing Figures

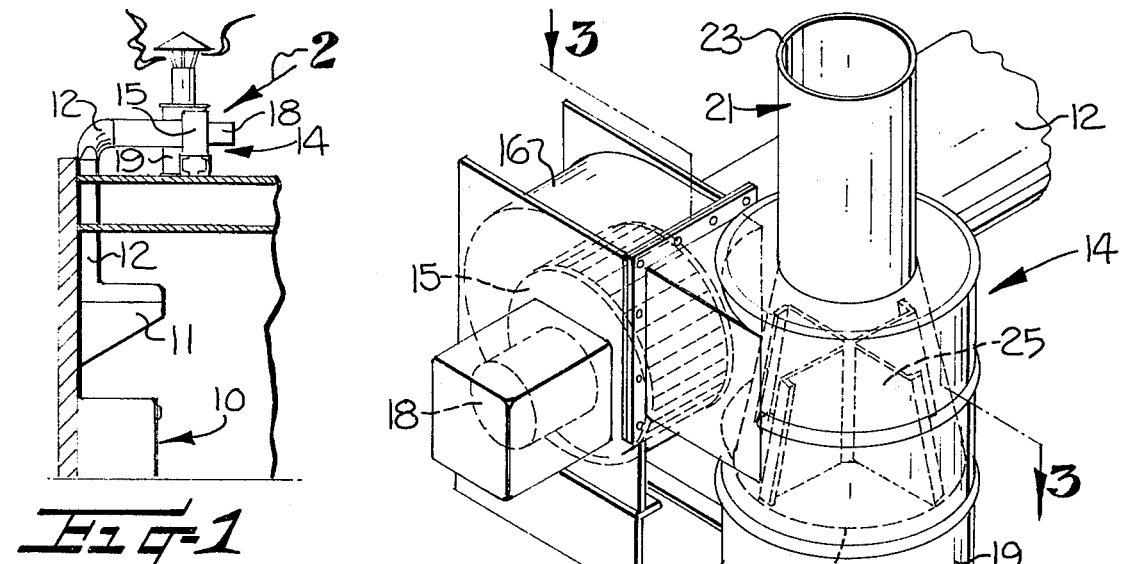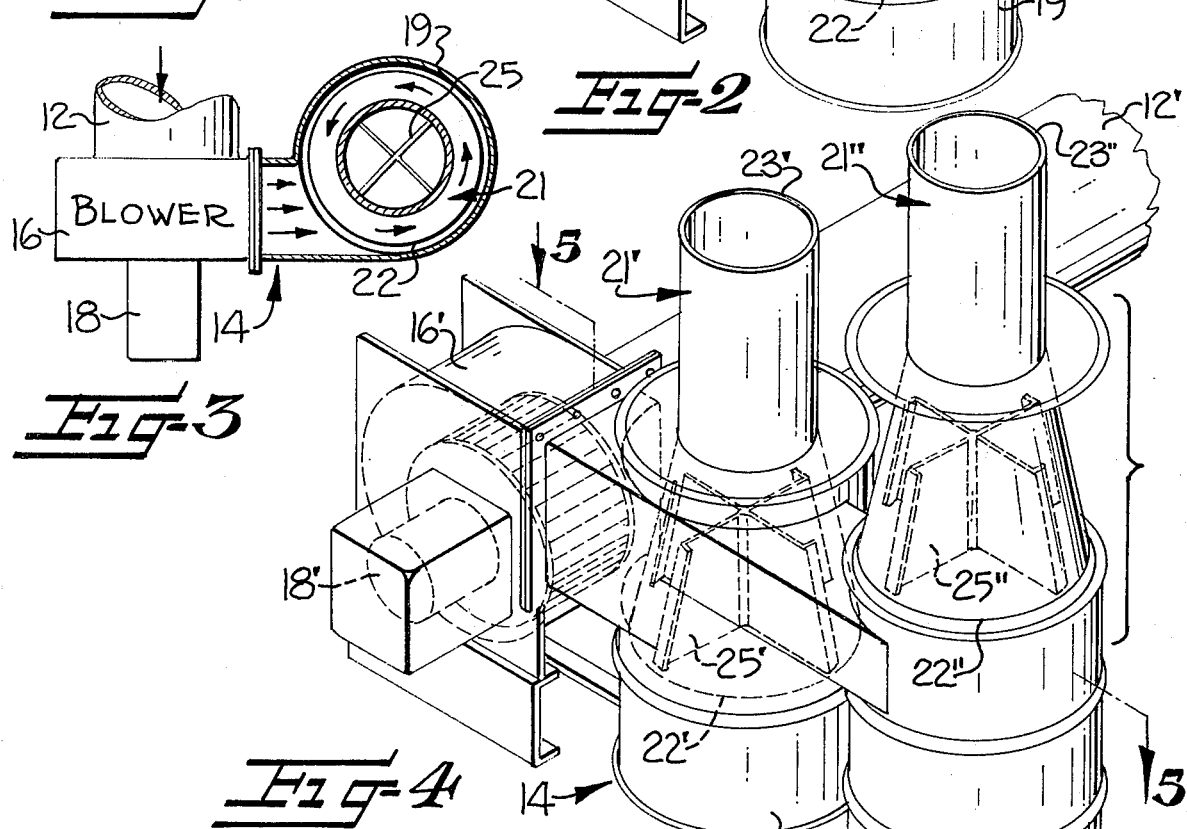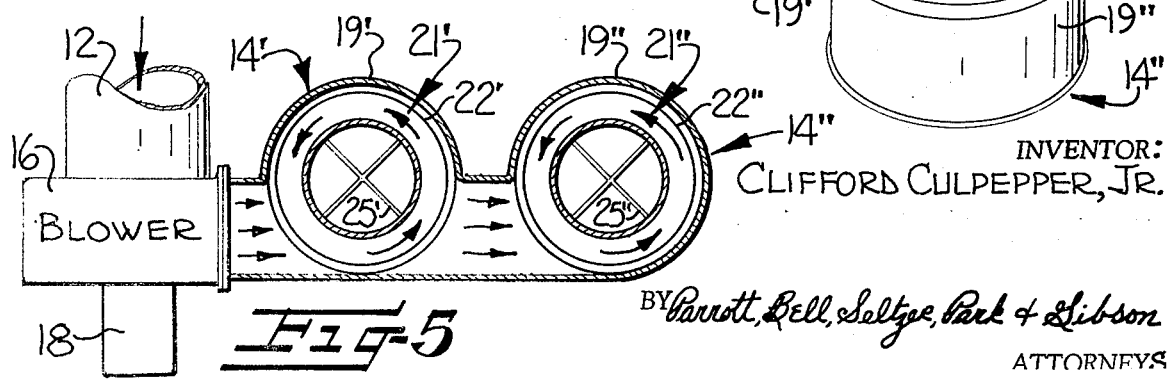

VENTILATION APPARATUS AND METHOD

This application is a continuation-in-part of copending application Ser. No. 41,995, filed June 1, 1970 now abandoned and entitled METHOD AND APPARATUS FOR COLLECTING AIRBORNE DEBRIS, and of application Ser. No. 820,377, filed Apr. 30, 1969 and now U.S. Pat. No. 3,585,919, issued June 22, 1971.

While problems of air pollution have long been recognized to exist in a variety of circumstances, two recent developments have made particularly apparent difficulties in the disposal of certain types of airborne debris. Specifically, a growing awareness of the results of air pollution has led to more stringent enforcement of ordinances and regulations regarding the release of such airborne debris and to the enactment of additional restrictive controls and legislation. Secondly, the number of potential offenders against air pollution regulations has been significantly increased by the proliferation of food preparation and handling businesses which operate on a fast service concept through the use of certain cooking apparatus.

Fast service food businesses are exemplary of businesses in which processes are practiced by which particularly difficult effluents are generated. More particularly, a workspace used as a food preparation area within a building serving as a fast food service location will become filled with airborne liquid particulate grease (as defined more particularly hereinafter), typically due to cooking of meat at temperatures of at least about 500° Fahrenheit on apparatus such as a char-broiler. Such airborne liquid particulate grease is distinct from spattering liquid grease such as is typically generated by other, lower temperature, cooking practices. Due to generation of such effluent, ventilation is important for the comfort and well-being of employees and customers who may be present in or exposed to the environment of the workspace.

Heretofore, attempts to deal with ventilation of work-spaces where processes are practiced by which airborne liquid particulate grease is generated have typically involved restricting the flow of air from the area by means of filters, traps or the like in the workspace. Apparently, these attempts have been influenced by a desire of fire and health authorities to preclude passage of grease into ducts and to permit inspection and cleaning in the workspace of all apparatus components possibly wetted by the grease. Such arrangements suffer from the necessity of frequent removal and cleaning of filter media or other components and the expense involved in periodic replacement of such components.

With a view to the difficulties heretofore encountered where compliance with pollution control regulations is attempted by a business operation practicing a process by which airborne liquid particulate grease is generated, it is an object of the present invention to accomplish ventilation of a workspace within a building where such a process is practiced while disposing of airborne liquid particulate grease by collecting the grease at a location remote from the workspace. To this end, airborne particulate grease is entrained with flowing air, removed from the workspace and, at a remote location, passed into a collection chamber and along a flow path therewithin which results in separation of the entrained grease from the stream of air. The separated grease is then retained in the collection chamber as the flowing air which conveyed the grease to the collection chamber is passed to the ambient atmosphere.

A further object of this invention is the collection of airborne liquid particulate grease by inducement of a flow of air through an unrestricted hood positioned adjacent a workspace and through an unrestricted duct to a remote location where a collection chamber means is interposed between the workspace and the ambient atmosphere for passage of the flowing air therethrough. In accordance with this invention, means are provided in operative association with the collection chamber means for directing the flowing air and entrained liquid particulate grease to pass along the path such that the entrained grease is separated from the stream of air within the collection chamber means and the air passing to the ambient atmosphere is substantially free of such entrained debris.

Some of the objects of the invention having been stated, other objects will appear as the description proceeds, when taken in connection with the accompanying drawings, in which FIG. 1 is an elevation view, in partial section, illustrating a combination in accordance with this invention;

FIG. 2 is an enlarged perspective view of a collection apparatus in accordance with this invention and as incorporated in the combination illustrated in FIG. 1;

FIG. 3 is a plan view, in partial section, of the apparatus of FIG. 2, taken generally along the line 3—3 in that figure;

FIG. 4 is a view similar to FIG. 2 of a modified form of collection apparatus in accordance with this invention; and FIG. 5 is a view similar to FIG. 3 through the apparatus of FIG. 4, taken generally along the line 5—5 in that figure.

While the present invention has been illustrated in the accompanying drawings and will be described hereinafter with reference to the best mode contemplated at the time this description is prepared, it is to be understood that the invention is contemplated as having general utility in connection with the ventilation of workspaces within a building where processes are practiced by which airborne liquid particulate grease is generated. Accordingly, the choice of specific modes of the invention for illustration and description is not to be considered as limiting on this invention, which is to be understood broadly.

In the present description, the effluent constituent to be separated and collected is identified by the phrase "airborne liquid particulate grease". While each word of this phrase is believed readily understandable, when taken alone, it is believed desirable to acknowledge the particular meaning intended by the phrase when so used. It has been discovered that grease may be discharged in globules of relatively small size while maintaining a liquid character. These relatively small globules are here characterized as being particulate, with the further characterization of liquid indicating the distinction between grease in the form referred to and dry solids such as sand, dust and the like. Such liquid particulate grease becomes and remains airborne, as identified herein, where the particles are of such small size that the drag co-efficient of the particles in a flowing stream of air overcomes any effect of gravity on the mass of the particle. In such an instance, the airborne liquid particulate grease is entrained in and moved by flowing air, while larger particles of grease have such mass as to be acted upon by gravity and not be conveyed. Such larger particles of grease typically splatter, as is known in frying or cooking on conventional griddles.

Yet a further characteristic property of airborne liquid particulate grease is the tendency of such material to agglomerate. In this invention, this characteristic tendency is used to increase the particle size and mass to such a point that further conveyance is prevented and to wet surfaces from which liquid grease slumps for collection. It has been noted that airborne liquid particulate grease, as heretofore defined, is generated during the cooking of meat such as hamburger and steak at temperatures of at least about 500° Fahrenheit on apparatus such as a charbroiler. In a charbroiler, meat products are placed upon an open grill so as to be situated above heated rock and the like, in simulation of charcoal cooking. While it has thus far not been possible to accurately determine the physical dimensions or temperature of airborne liquid particulate grease as here defined, it is believed at the time this description is prepared that such grease particles fall, in physical diametrical size, in the range of from about 5 microns to about 10 microns. While this understanding of airborne liquid particulate grease is the theory upon which understanding of this invention is presently based, it is to be noted that accurate physical measurement may, when attainable, prove that the circumstances of operation of this invention are other than those expressed here. It is also to be noted that airborne liquid particulate grease may be generated by processes other than cooking.

Referring now more specifically to the drawings, the present invention is there particularly illustrated as the combination, with an air flow guiding means positioned adjacent a food preparation workspace within a building and air flow inducing means operatively communicating with the air flow guiding means for drawing air bearing liquid particulate grease from the workspace, of means for collecting the airborne liquid particulate grease. In disposing of such grease, the present invention contemplates the practice of a method in which airborne liquid particulate grease is entrained in a stream of air flowing from a food preparation workspace to and through a collection chamber. The stream of air and entrained grease is passed along an at least partially circular, sharply turning flow path within the collection chamber while the flow thereof is first accelerated and then decelerated, separating entrained grease from the stream of air and passing the air to the ambient atmosphere.

In a first form of the apparatus in accordance with the present invention, and as contemplated by the method of this invention, a flow of air and entrained grease is directed from a food preparation workspace such as surrounds the charbroiler generally indicated at 10 (FIG. 1) by a hood 11. The hood 11 communicates with the exterior of a building housing the food preparation workspace through a suitable air flow duct means 12 which, in the particular structure illustrated in FIG. 1, penetrates the roof of the building structure to reach the remainder of the apparatus in accordance with the present invention.

Installed on the roof of the building structure illustrated in FIG. 1 is a collection chamber means generally indicated at 14 and operatively communicating with the hood 11 through the duct means 12. Interposed between the collection chamber means 14 and the hood 11 is an air flow inducing means here shown as a centrifugal fan 15 housed within an appropriate scroll housing 16 and driven in rotation by an electrical drive motor 18. By the operative communication of the air flow inducing means with the hood 11, a stream of air is drawn from the workspace within the building when the fan rotor 15 is driven in rotation, entraining debris therein and directing the airborne debris into the collection chamber means 14. It is significant to this invention that the hood 11 and duct 12 are unrestricted by filters or other components, to permit completely free flow of grease to the collection chamber means 14.

As illustrated in FIGS. 2 and 3, the collection chamber means 14 preferably comprises an elongate container 19 having a generally right circular cylindrical interior wall surface. By the provision of a connection between the scroll housing 16 of the air flow inducing means and the elongate container 19, the stream of air and grease is directed to enter the elongate container 19 generally at a right angle to the longitudinal axis of the container and tangentially to the inner wall surface thereof. Entrance of the stream of air and entrained grease into the container 19 in this manner results in spinning motion of the air and grease within the container 19 (as indicated by arrows in FIG. 3). Such a spinning motion imposes centrifugal forces on the entrained grease, tending to aggolomerate and separate the liquid particulate grease from the stream of air.

The means operatively associated with the collection chamber means for directing the stream of air and entrained grease to pass along a particular flow path therewithin further includes an elongate tubular outlet conduit 21 extending from a first termination 22 within the container 19 to a remote termination 23 outside the container 19. In order to direct the stream of air and entrained debris in a desired manner, the first termination 22 of the outlet conduit 21 is spaced along the longitudinal axis of the container 19 from the inlet passage through which air and entrained debris enter the container 19. Due to this structural relation, the stream of air is directed to flow between the conduit and the inner wall surface of the container 19 in a first direction along the longitudinal axis of the container 19 and then is turned within the container 19 to exit therefrom by flowing within the conduit 21 in the opposite direction along the longitudinal axis. By such a reverse turning path for flow of the stream of air within the collection chamber means 14, forces imposed on the entrained grease are increased and separation of the entrained grease is facilitated. As will be understood, such separation depends in part upon relative mass of the entrained grease and the air flowing in the stream and resulting inertia, in that entrained liquid particulate grease does not move with the air flow through the sharply turning path required to gain egress from the container 19.

Preferably, and in accordance with the present invention, that portion of the outlet conduit 21 normally lying within the container 19 has an outer wall surface defining with the container inner wall surface a reducing cross-sectional area for flow, by at least a portion of the outer wall surface adjacent the first termination 22 of the outlet conduit 21 having a conical configuration. The reduction in cross-sectional area of the flow passage thereby accomplished results in acceleration of a velocity of flow of the airstream therethrough. By the converse, the velocity of flow of the airstream within the conduit 21, on initially entering the conduit, is reduced, thereby increasing the contrast of the velocities and facilitating separation of entrained grease from the airstream.

Inasmuch as such separation of entrained grease is facilitated by contrast in flow conditions, the stream direction means further includes flow straightener means in the outlet conduit 21 for directing flow of the stream of air therethrough substantially along axial lines. Preferably, such flow straightening means comprises cross-baffles or egg crate members 25, arranged to resist or prevent swirling motion within the outlet conduit 21 similar to that occurring in the flow passage between the inner wall surface of the container and the outer wall surface of the outlet conduit 21.

The outer wall surface of the conical portion of the outlet conduit 21 is wetted by grease which agglomerates during swirling motion of the air about that surface. Grease slumps from the wetted surface toward the lower extremity of the outlet conduit 21 and sheets or drops from that extremity. Due to spacing of the cross-baffles 25 above that lower termination, slumping grease is thrown downwardly to the bottom of the container 19 and is not carried upwardly through the outlet conduit 21.

While discussed thus far with particular reference to FIGS. 1–3, it is contemplated by the present invention that the apparatus of the present invention may be arranged to accommodate flow volumes greater than those achievable with a single container 19. In particular, efficient separation of airborne liquid particulate grease from a flowing stream of air is impaired where it is necessary to substantially increase the velocities of air flow through the apparatus in order to remove a desired volume of air from a workspace. Where the desired volume of air to be removed exceeds that efficiently handled by a single container 19, a series flow arrangement of two containers 19', 19'' as illustrated in FIGS. 4 and 5 may be adopted. As to each of the containers there illustrated as forming a portion of the collection chamber means 14', the direction of air flow is substantially as described heretofore with reference to FIGS. 1 – 3. It is to be noted that the inlet means coupling the scroll housing 16' of the apparatus illustrated in FIG. 4 to the two containers 19', 19'' provides for distribution of air flow between the two containers, through a reduction of available air flow area by approximately one-half intermediate the two containers 19' and 19''.

In the drawings and specification, there has been set forth a preferred embodiment of the invention, and although specific terms are employed, they are used in a generic and descriptive sense only and not for purposes of limitation.

That which is claimed is:

1. Apparatus for ventilating a workspace within a building where a process is practiced by which airborne liquid particulate grease is generated, such as a food preparation area where meat is cooked at temperatures at least of about 500°F. on apparatus such as a charbroiler, and for collecting grease from the ventilation effluent so as to discharge effluent complying with pollution control regulations, the apparatus comprising:

an unrestricted hood means mounted in the workspace, collection chamber means mounted at a location remote from the workspace for collecting grease and having an elongate container with an inner wall surface which is of right circular cylindrical configuration throughout the height thereof and a lower wall closing the lower end of said container, unrestricted duct means extending between said hood means and said collection chamber means for establishing operative communication therebetween, fan means located remote from the workspace and operatively communicating with said hood means and said duct means and said collection chamber means for inducing air to flow at conveying velocity from the workspace into said hood means and through said duct means and for discharging flowing air and conveyed grease into said collection chamber means, said hood means and said duct means cooperating for entraining airborne liquid particulate grease with flowing air and thereby unrestrictedly conveying entrained grease from the workspace to the remote location, and means operatively associated with said duct means and said collection chamber means for directing the flowing air and conveyed grease thereinto and along a circular and turning flow path within said chamber means while first accelerating and then decelerating the velocity of flow thereof and thereby separating the conveyed grease from the flowing air and retaining the separated grease in the collection chamber while passing to the ambient atmosphere the flowing air which conveyed the grease to the collection chamber, said flow directing means including inlet means for directing the air and conveyed grease entering said container generally at a right angle to the longitudinal axis of said container and tangentially to said inner wall surface, an upper wall closing a portion of the upper end of said container and an elongate tubular outlet conduit penetrating said upper wall and extending within said container generally centrally thereof and coaxially with the longitudinal axis of said container, said tubular conduit terminating within said container at a location spaced along said longitudinal axis from said inlet means so that the air in passing through said container flows both along and about said longitudinal axis and having an outer wall surface defining with said container inner wall surface a flow passage for air and conveyed grease and with at least a portion of said outer wall surface adjacent said first termination of said outlet conduit having a conical configuration for reducing the cross-sectional area of said flow passage and increasing the cross-sectional area bounded within said outlet conduit for accelerating the velocity of flow of air through said flow passage and decelerating the velocity of flow of air through said outlet conduit.

2. A method of ventilating a workspace within a building where a process is practiced by which airborne liquid particulate grease is generated, such as a food preparation area where meat is cooked at temperatures of at least about 500°F. on apparatus such as a charbroiler, while collecting grease from the ventilation effluent so as to discharge effluent complying with pollution control regulations, the method comprising the steps of:

exerting suction at a location remote from the workspace and inducing air to flow at conveying velocity from the workspace into an unrestricted hood and through an unrestricted duct to the remote location by drawing flowing air from the workspace to and through a fan located remotely from the workspace, entraining airborne liquid particulate grease with the flowing air and thereby unrestrictedly conveying entrained grease from the workspace to the remote location, and at the remote location, directing the flowing air and conveyed grease from the fan into a collection chamber and turning the flowing air and conveyed grease along a circular path defined by a right circular cylindrical inner wall surface of the collection chamber by admitting the flowing air and conveyed grease to the collection chamber tangentially of the inner wall surface and perpendicularly to an axis central to the wall surface, directing the flowing air and conveyed grease in a first direction longitudinally of the central axis and between the inner wall surface and a cone surface converging with the inner wall surface to define therewith a circular throat zone, and then directing the flowing air longitudinally of the central axis through the cone in a direction opposite to the first direction and through a chamber exit which has an area greater than the area of the throat zone while straightening the flow in the direction opposite the first longitudinal direction to direct the flowing air substantially along longitudinal lines through the chamber exit, and retaining the separated grease in the collection chamber while passing the flowing air from the chamber exit to the ambient atmosphere.

3. A method according to claim 2 further comprising agglomerating conveyed grease within the volume defined between the inner wall surface and the cone surface while wetting the cone surface with agglomerated grease and while slumping grease from the wetted cone surface.

* * * * *